(12) United States Patent
Udagawa

(10) Patent No.: US 8,331,111 B2
(45) Date of Patent: Dec. 11, 2012

(54) SWITCHING POWER SUPPLY DEVICE

(75) Inventor: Kazuhiko Udagawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 694 days.

(21) Appl. No.: 12/289,950

(22) Filed: Nov. 7, 2008

(65) Prior Publication Data

US 2009/0129129 A1 May 21, 2009

(30) Foreign Application Priority Data

Nov. 20, 2007 (JP) ................................. 2007-299988

(51) Int. Cl.
*H02M 3/335* (2006.01)

(52) U.S. Cl. .................................. 363/21.07; 363/21.09
(58) Field of Classification Search .................... 363/81, 363/86, 44–48, 21.01, 21.06–21.07, 21.09–21.11, 363/74–76, 78, 82, 84; 323/205, 210–211, 323/241, 271, 282–286, 318, 322, 351, 363
See application file for complete search history.

(56) References Cited

U.S. PATENT DOCUMENTS

| | | | | |
|---|---|---|---|---|
| 5,034,871 A * | 7/1991 | Okamoto et al. | ................ | 363/15 |
| 7,038,436 B2 * | 5/2006 | Goto et al. | ..................... | 323/282 |
| 2005/0162216 A1 * | 7/2005 | Ueda | ............................. | 327/540 |
| 2007/0002592 A1 * | 1/2007 | Muramatsu | ................ | 363/21.01 |

FOREIGN PATENT DOCUMENTS

| | | |
|---|---|---|
| JP | 5-30735 | 2/1993 |
| JP | 05-030735 | 2/1993 |
| JP | 2004-304898 A | 10/2004 |
| JP | 3111439 | 6/2005 |
| JP | 2006-352975 | 12/2006 |

* cited by examiner

*Primary Examiner* — Jue Zhang
*Assistant Examiner* — Henry Lee, III
(74) *Attorney, Agent, or Firm* — Morgan, Lewis & Bockius LLP

(57) ABSTRACT

A switching power supply device 100 includes: zener diodes ZD31 and ZD32 that become conducting when the voltage values of direct current voltages VO1 and VO2 are equal to or more than their zener voltage values, respectively; an overcurrent protection circuit 131 that makes a switching portion 12 stop generating the direct current voltages if an overcurrent that is equal to or more than a previously set current threshold value flows in the secondary winding 23 of a transformer 2; and a diode D3 one end of which is connected to the output end of a regulator 32 and the other end of which is connected between voltage divider resistances R41 and R42, the forward direction of the diode D3 being from the voltage divider resistances R41 and R42 to the regulator 32.

10 Claims, 2 Drawing Sheets

SWITCHING POWER SUPPLY DEVICE

This application is based on Japanese Patent Application No. 2007-299988 filed on Nov. 20, 2007, and the contents of which are hereby incorporated by reference.

BACKGROUND OF THE INVENTION

1. Field of the Invention

The present invention relates to a switching power supply device which is disposed in an electronic equipment, generates direct current voltage having a first voltage value that is set in advance from power which is supplied from commercial power, and supplies direct current voltage based on the generated direct current voltage to devices disposed in the electronic equipment.

2. Description of the Related Art

Conventionally, in a regulated power supply circuit, such as a three terminal regulator, a chopper type regulator or the like, which is connected to a switching power supply device, in case where the regulated power supply circuit becomes an overload state by short circuit or the like of a load that is connected to an output terminal of the regulated power supply circuit, there is fear that the regulated power supply circuit generates heat and burns out. To solve the above described problem, various kinds of devices, methods, or the like have been proposed heretofore.

For example, a switching power supply device is disclosed in JP-A-2004-304898, which includes: a detecting circuit that is connected between an output terminal of a three terminal regulator and an output terminal of a main output circuit, detects that voltage of the regulator becomes lower than voltage of the main output, and outputs a detecting signal; an output circuit that outputs a power stop signal in response to the detecting signal; a second photo coupler that electrically insulates primary side and a secondary side and outputs the power stop signal to a PWM control circuit as a second feedback signal; and the PWM control circuit that outputs a signal to turn "OFF" a switching element as an "ON, OFF" control signal in response to the second feedback signal to the switching element to stop the switching power supply device.

However, in the above described switching power supply device, because it is necessary to dispose the detection circuit, the output circuit, the second photo coupler, and the like, production cost of the switching power supply device becomes high.

SUMMARY OF THE INVENTION

It is an object of the present invention to provide a switching power supply device which can stop a switching operation with simple structure in case where a load that is connected to a regulated power supply circuit is shunted.

To attain the above described object a switching power supply device in accordance with the present invention which is disposed in an electronic equipment, generates a direct current voltage which has a first voltage value that is set in advance from electric power which is supplied from a commercial power source, and supplies a direct current voltage based on the generated direct current voltage to a device that is disposed in the electronic equipment, the switching power supply device includes: a direct current voltage generating portion which has a switching element and a transformer and generates a direct current voltage having at least one voltage value from the power that is supplied from the commercial power source through the switching element and the transformer; a control voltage detecting portion which detects a control voltage that is a voltage which is proportional to voltage of a secondary side of the transformer; a feedback current detecting portion which detects a feedback current that is current which is approximately proportional to a direct current voltage that is generated by the direct current voltage generating portion and corresponds to the first voltage value; at least one over current generating portion which becomes conduction state and makes over current that is current of a prescribed current threshold value set in advance or more flow to the secondary side of the transformer in case where voltage value of the direct current voltage which is generated by the direct current voltage generating portion is a prescribed voltage threshold value set in advance or more; a control portion which has an over current protection circuit that makes the direct current voltage generating portion stop generation of the direct current voltage in case where an over current which is current of the current threshold value set in advance or more flows in the secondary side of the transformer, and controls the direct current voltage which is generated by the direct current voltage generating portion based on the voltage value of the control voltage and electric current value of the feedback current; a constant voltage output portion which direct current voltage that corresponds to the first voltage value generated by the direct current voltage generating portion is input to, and outputs direct current voltage that has a second voltage value which is different from the first voltage value; and a feedback current decreasing portion which makes electric current value of the feedback current that is detected by the feedback current detecting portion to be electric current value of feedback current when the direct current voltage generated by the direct current voltage generating portion has a voltage value which is less than the first voltage value in case where voltage value of a load side of the constant voltage output portion is a prescribed voltage threshold value set in advance or less.

By this structure, in case where the load which is connected to the regulated power supply circuit (the constant voltage output portion in this explanation) is shunted, a direct current voltage that is generated is increased by the control portion, because the feedback current decreasing portion makes a electric current value of the feedback current to be a electric current value of the feedback current when the generated direct current voltage has a voltage value that is less than the first voltage value. Then, the over current generating portion makes an over current of a prescribed current threshold value set in advance or more flow in the secondary side of the transformer, and generation of the direct current voltage is stopped by the over current protection circuit. As a result, the switching operation can be stopped with simple structure in case where the load which is connected to the regulated power supply circuit (the constant voltage output portion in this explanation) is shunted.

Further, the switching power supply device in accordance with the present invention may employ structure in which the feedback current detecting portion is provided with a photo coupler and feeds back the feedback current to the control portion through the photo coupler in the above described structure.

By this structure because the feedback current detecting portion is provided with the photo coupler and the feedback current is fed back to the control portion through the photo coupler, the feedback current can be fed back to the control portion in a state where the primary side and the secondary side are electrically insulated. As a result, the switching operation can be surely stopped in case where the load which is connected to the regulated power supply circuit (the constant voltage output portion in this explanation) is shunted.

Further, the switching power supply device in accordance with the present invention may employ structure in which the feedback current decreasing portion sets the electric current value of the feedback current approximately zero in case where the voltage value of the load side of the constant voltage output portion is a second voltage threshold value set in advance or less in the above described structure.

By this structure, because the electric current value of the feedback current is set in approximately zero by the feedback current decreasing portion in case where the voltage value of the load side of the regulated power supply circuit (the constant voltage output portion in this explanation) is the second voltage threshold value set in advance or less, the generated direct current voltage is quickly increased by the control portion. As a result, the switching operation can be quickly stopped in case where the load which is connected to the regulated power supply circuit (the constant voltage output portion in this explanation) is shunted.

Further, the switching power supply device in accordance with the present invention may employ structure in which the feedback current detecting portion is provided with a shunt regulator one end of which is connected to a light emitting element of the photo coupler in series and another end of which is grounded, and voltage divider resistances which generate a feedback voltage that corresponds to the feedback current from the direct current voltage generated by the direct current voltage generating portion and apply it as a reference voltage to the shunt regulator, and the feedback current decreasing portion makes the electric current value of the feedback current approximately zero by making the feedback voltage to be a breakdown voltage of the shunt regulator or less in the above described structure.

By this structure, the feedback current detecting portion is provided with the shunt regulator one end of which is connected to the light emitting element of the photo coupler in series and another end of which is grounded, the voltage divider resistances generate the feedback voltage that corresponds to the feedback current from the direct current voltage generated by the direct current voltage generating portion and apply it as a reference voltage to the shunt regulator, and the feedback current decreasing portion makes the feedback voltage to be a breakdown voltage of the shunt regulator or less to make the electric current value of the feedback current to be approximately zero. As a result, the switching operation can be stopped with simpler structure in case where the load which is connected to the regulated power supply circuit (the constant voltage output portion in this explanation) is shunted.

Further, the switching power supply device in accordance with the present invention may employ structure in which the feedback current decreasing portion is composed of a diode one end of which is connected to an output end of the constant voltage output portion and another end of which is connected to between the voltage divider resistances, and forward direction of the diode being from the voltage divider resistances to the constant voltage output portion in the above described structure.

By this structure, because the feedback current decreasing portion is composed of a diode one end of which is connected to an output end of the constant voltage output portion and another end of which is connected to between the voltage divider resistances, and forward direction of the diode being from the voltage divider resistances to the constant voltage output portion, the feedback current decreasing portion can be realized with simple structure. As a result, the switching operation can be stopped with simpler structure in case where the load which is connected to the regulated power supply circuit (the constant voltage output portion in this explanation) is shunted.

Further, the switching power supply device in accordance with the present invention may employ structure in which the direct current voltage generating portion generates direct current voltages which have a plurality of voltage values, and the over current generating portion are disposed for respective direct current voltages that correspond to the plurality of the voltage values in the above described structure.

By this structure, in case where the generated direct current voltage is increased by the control portion, the over current generating portion which respectively corresponds to the plurality of the direct current voltages are made to be the conduction state in order of voltage value exceeding the voltage threshold value, the switching operation can be stopped more quickly in case where the load that is connected to the regulated power supply circuit (the constant voltage output portion in this explanation) is shunted.

Further, the switching power supply device in accordance with the present invention may employ structure in which the over current generating portion is composed a zener diode one end of which is connected to an output terminal of the direct current voltage generating portion and another end of which is grounded in the above described structure.

By this structure because the over current generating portion is composed a zener diode one end of which is connected to an output terminal of the direct current voltage generating portion and another end of which is grounded, the over current generating portion can be realized with simple structure. As a result, the switching operation can be stopped with simpler structure in case where the load which is connected to the regulated power supply circuit (the constant voltage output portion in this explanation) is shunted.

Further, the switching power supply device in accordance with the present invention may employ structure in which the constant voltage output portion is composed of a DC-DC converter or a series regulator in the above described structure.

By this structure because the constant voltage output portion is composed of a DC-DC converter or a series regulator, the switching operation can be stopped with simple structure in case where the load which is connected to the DC-DC converter or the series regulator is shunted.

Further, the switching power supply device in accordance with the present invention may employ structure in which the control voltage detecting portion is provided with an auxiliary winding which is disposed in a primary side of the transformer and detects voltage between both ends of the auxiliary winding as the control voltage in the above described structure.

By this structure, because the voltage between the both ends of the auxiliary winding which is disposed in the primary side of the transformer is detected by the control voltage detecting portion as the control voltage, the control voltage detecting portion can be realized with simple structure. As a result, the switching operation can be stopped with simpler structure in case where the load which is connected to the regulated power supply circuit (the constant voltage output portion in this explanation) is shunted.

Further, the switching power supply device in accordance with the present invention may employ structure in which the over current protection circuit judges whether the over current flows or not based on the electric current value of current which flows in the auxiliary winding of the control voltage detecting portion in the above described structure.

By this structure, because the over current protection circuit judges whether the over current flows or not based on the electric current value of current which flows in the auxiliary winding of the control voltage detecting portion, it can be judged whether the over current flows or not by the simple structure. As a result, the switching operation can be stopped with simpler structure in case where the load which is connected to the regulated power supply circuit (the constant voltage output portion in this explanation) is shunted.

DESCRIPTION OF THE PREFERRED EMBODIMENTS

Figure 1:
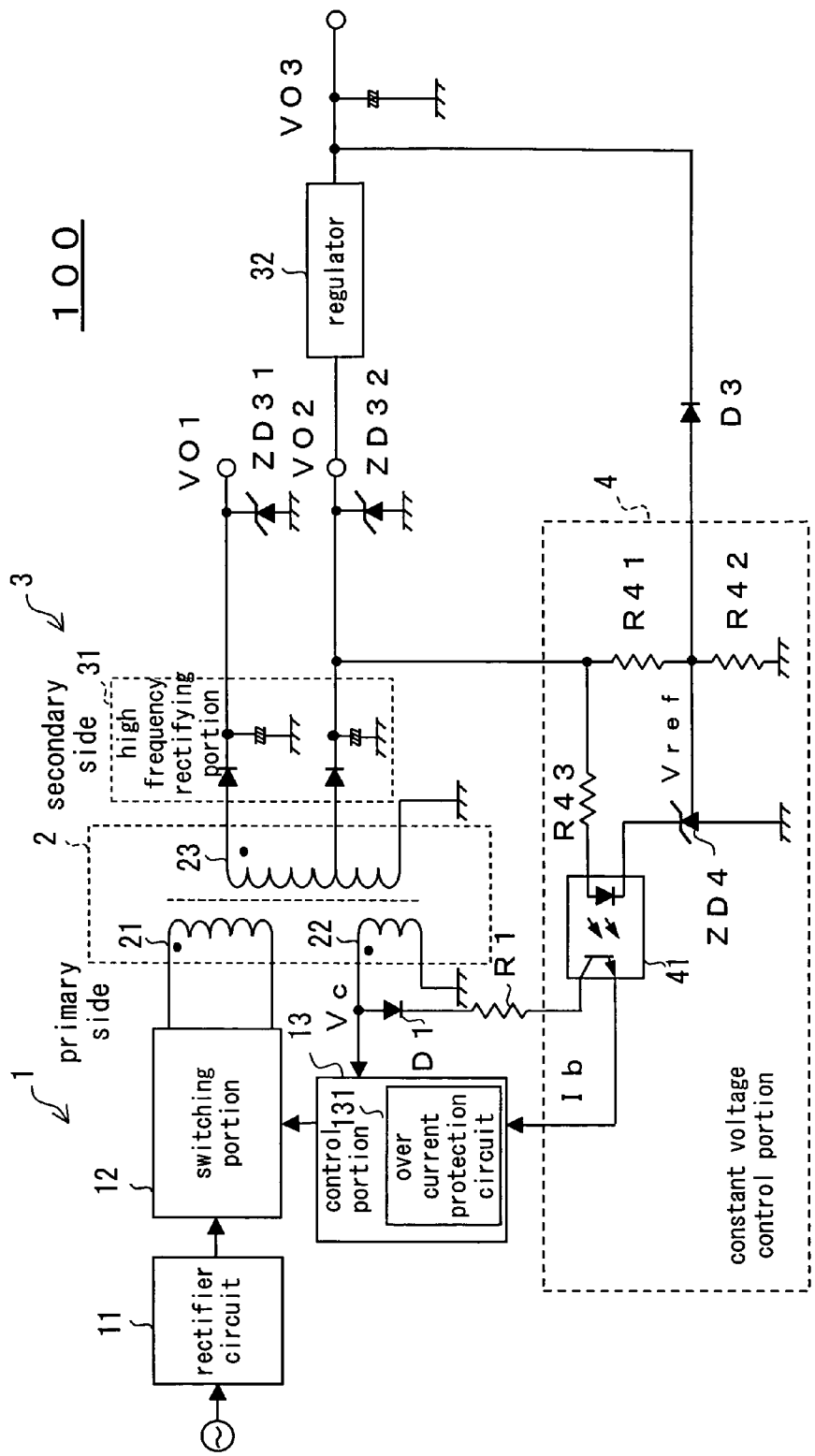
FIG. 1 is a structural diagram to show one example of structure of a switching power supply device in accordance with the present invention.
Figure 2:
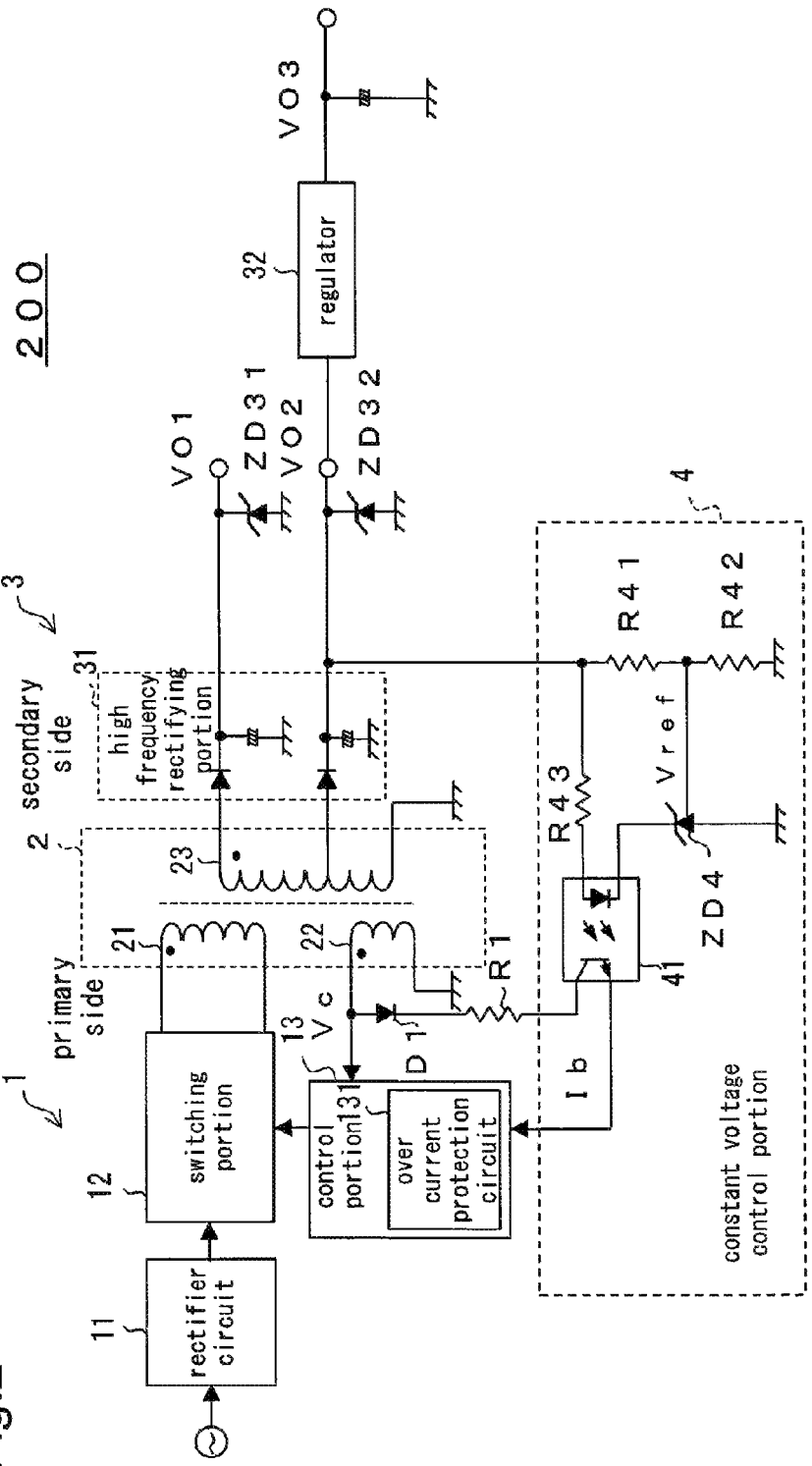
FIG. 2 is a structural diagram to show one example of structure of a conventional switching power supply device.

Hereinafter, embodiment of the present invention will be explained with reference to drawings. FIG. 1 is a structural diagram to show one example of structure of a switching power supply device in accordance with the present invention, and FIG. 2 is a structural diagram to show one example of structure of a conventional switching power supply device. At this point, in the structure of the switching power supply device 100 in accordance with the present invention, same reference numerals are given to common portion with the conventional switching power supply device 200, and explanation on them is omitted. First, explanation will be given about structure of the conventional switching power supply device with reference to FIG. 2.

As shown in FIG. 2, the conventional switching power supply device 200 generates direct current voltages having a plurality of voltage values (two in the present embodiment) containing a first voltage (5 volt in the present embodiment) which is set in advance from power which is supplied from commercial power, and the device is provided with a primary side circuit portion 1, a transformer 2, a secondary side circuit portion 3, and a constant voltage control portion 4. At this point in this description, explanation will be given about a case where the switching power supply device 200 is a switching power supply in a Ringing Choke Converter (RCC) method. The primary side circuit portion 1 is made to generate pulse-like direct current voltage (switching signal) which is supplied to a primary side winding 21 of the transformer 2 from alternative current power that is supplied from a commercial power source, and it is provided with a rectifier circuit 11, a switching portion 12, and a control portion 13.

The rectifier circuit 11 (corresponding to a part of a direct current voltage generating portion) is composed of a diode bridge circuit and the like, and rectifies the alternative current voltage which is supplied from the commercial power source and generates direct current voltage to supply to the switching portion 12. The switching portion 12 (corresponding to a part of the direct current voltage generating portion) is provided with a switching element such as a Field Effect Transistor (FET) and the like and make a direct current voltage which is input from the rectifier circuit 11 turn on and off in compliance with a direction from the control portion 13, and generates the pulse-like direct current voltage (switching signal) to supply to the primary side winding 21 of the transformer 2.

The control portion 13 (corresponding to the control portion) is provided with an over current protection circuit 131 and outputs "ON" or "OFF" direction to the switching portion 12 to control direct current voltages VO1, VO2 in the secondary side based on a voltage value of a control voltage Vc which is detected by an auxiliary winding 22 and an electric current value of feedback current Ib which is output from the constant voltage control portion 4. The over current protection circuit 131 is made to stop generation of the direct current voltage by the switching portion 12 (it makes the switching portion 12 stop switching operation) in case where over current of a current threshold value set in advance or more flows in the secondary winding 23 of the transformer 2. Further, the over current protection circuit 131 judges whether the over current flows in secondary winding 23 of the transformer 2 based on an electric current value of electric current which flows in the auxiliary winding 22.

The transformer 2 (corresponding to a part of the direct current voltage generating portion) is provided with the primary side winding 21, an auxiliary winding 22, and a secondary winding 23, and outputs a switching signal to the secondary side which corresponds to the pulse-like voltage (switching signal) that is output from the switching portion 12, and outputs the control voltage Vc to the control portion 13. The primary side winding 21 is applied the switching signal from the switching portion 12 and generates voltages corresponding to the auxiliary winding 22 and the secondary winding 23, respectively.

The secondary winding 23 generates voltage corresponding to the switching signal which is applied to the primary side winding 21 to output to the secondary side circuit portion 3 (a high frequency rectifying portion 31 which will be described later). The auxiliary winding 22 (corresponding to the control voltage detecting portion) generates the control voltage Vc which corresponds to the switching signal that is applied to the primary side winding 21 to output to the control portion 13. Further, because current flows in the auxiliary winding 22, which is approximately proportional to current that flows in the secondary winding 23, the over current protection circuit 131 can judge whether the over current flow in the secondary winding 23 of the transformer 2 based on an electric current value of electric current which flows in the auxiliary winding 22.

The secondary side circuit portion 3 is provided with a high frequency rectifying portion 31, zener diodes ZD31, ZD32, and a regulator 32 and applies the direct current voltage which is supplied from the secondary winding 23 to a load which is not shown. The high frequency rectifying portion 31 (corresponding to a part of the direct current voltage generating portion) eliminates a high frequency component which is contained in the direct current voltage that is supplied from the secondary winding 23 to output the direct current voltages VO1, VO2.

Each one end of the zener diodes ZD31, ZD32 (corresponding to an over current generating portion) is connected to an output terminal of the high frequency rectifying portion 31, and each of the other end is grounded, respectively. Each of them becomes conduction state to make the over current flow in the secondary winding 23 in case where each of voltage value of the direct current voltages VO1, VO2 which correspond respectively to a plurality of (two in the present embodiment) voltage values that are supplied from the secondary winding 23, is respectively a prescribed voltage threshold value (the zener voltage in the present embodiment) set in advance or more.

The direct current voltage VO2 that corresponds to a first voltage value (5 volt in the present embodiment) which is supplied from the secondary winding 23, is input to the regulator 32 (corresponding to a constant voltage output portion), and the regulator 32 outputs a direct current voltage VO3 that has a second voltage value (3.3 volt in the present embodiment) that is different from the first voltage value. Hereinafter, explanation will be given about a case where the regulator 32 is a three terminal regulator which is a kind of a series regulator.

The constant voltage control portion 4 (corresponding to a feedback current detecting portion) is provided with a photo coupler 41, a shunt regulator ZD4 and voltage divider resistances R41, R42, and detects an electric current value of the feedback current Ib which is current approximately proportional to the direct current voltage VO2 that corresponds to the first voltage value (5 volt in the present embodiment) which is supplied from the secondary winding 23 to output to the control portion 13.

One end of the voltage divider resistance R41 is connected to an output terminal of the direct current voltage VO2 which corresponds to the first voltage value (5 volt in the present embodiment) that is supplied from the secondary winding 23. The other end is connected to one end of the voltage divider resistance R42. The other end of the voltage divider resistance R42 is grounded. That is, the voltage divider resistances R41, R42 are made to generate a feedback voltage by dividing the voltage value of the direct current voltage VO2 with its resistance value to apply it to the shunt regulator ZD4 as a reference voltage Vref. That is, the reference voltage Vref which is applied to the shunt regulator ZD4 is obtained by formula (1) below.

$$Vref = VO2 \times R42/(R41+R42) \quad (1)$$

The shunt regulator ZD4 is made to increase or to decrease current which flows in a light emitting diode of the photo coupler 41 based on the reference voltage Vref that is applied from the voltage divider resistances R41, R42. To be more concrete, the shunt regulator ZD4 is made to cut off the current which flows in the light emitting diode of the photo coupler 41 in case where the reference voltage Vref is a breakdown voltage (for example, 2.4 volt) or less, or to make a current that is proportional to the reference voltage Vref flow in the light emitting diode of the photo coupler 41 in case where the reference voltage Vref is larger than the breakdown voltage (2.4 volt in the present embodiment).

The photo coupler 41 is composed of the light emitting diode (corresponding to a light emitting element) and a phototransistor, a current which is proportional to a current that flows in the light emitting diode through the shunt regulator ZD4, flows a base and a collector of the phototransistor in a state where a primary side and a secondary side are electrically isolated, and the photo coupler 41 outputs a feedback current Ib (the collector current of the phototransistor) to the control portion 13. That is, the photo coupler 41 is made to output the feedback current Ib which is proportional to voltage value of the direct current voltage VO2 to the control portion 13 in case where the reference voltage Vref is larger than the breakdown voltage (2.4 volt in the present embodiment).

Explanation will be given about voltage control operation of the conventional switching power supply device 200 structured as above described. In case, for example, the direct current voltage VO2 is larger than 5 volt that is a setting voltage (the first voltage value), based on the above formula (1), the reference voltage Vref is increased through the voltage divider resistances R41, R42, and the feedback current Ib also is increased through the photo coupler 41. Further, the control voltage Vc from the auxiliary winding 22 also is increased. Then, because the control portion 13 outputs to the switching portion 12 a command signal to make oscillation cycle small in order to make the direct current voltage VO2 to be 5 volt (the first voltage value) that is the setting voltage, the direct current voltage VO2 is made small.

To the contrary, in case where the direct current voltage VO2 is smaller than 5 volt (the first voltage value) that is a setting voltage, based on the above formula (1), the reference voltage Vref becomes small through the voltage divider resistances R41, R42, and the feedback current Ib also becomes small through the photo coupler 41. Further, the control voltage Vc from the auxiliary winding 22 also becomes small. Then, because the control portion 13 outputs to the switching portion 12 a command signal to make the oscillation cycle large in order to make the direct current voltage VO2 to be 5 volt (the first voltage value) that is the setting voltage, and the direct current voltage VO2 is made large. In this way, the direct current voltage VO2 is controlled to be 5 volt (the first voltage value) which is the setting voltage in the switching power supply device 200.

Hereinafter, explanation will be given about an operation of the conventional switching power supply device 200 when load of the regulator 32 is shunted in a state where the direct current voltage VO2 is 5 volt (the first voltage value) that is the setting voltage. When load of the regulator 32 is shunted, the regulator 32 judges that the load is too much and current which flows in the regulator 32 is increased. On the other hand, the direct current voltage VO2 which is voltage of input side of the regulator 32 is maintained in 5 volt (the first voltage value) by the above described voltage control operation.

Because current which flows in the regulator 32, is increased, Joule's heat that is generated in the regulator 32 is also increased, in case where temperature of the regulator 32 exceeds allowable temperature of the regulator 32, there is fear that the regulator 32 is damaged.

Next, explanation will be given about structure of the switching power supply device 100 in accordance with the present invention with reference to FIG. 1. The switching power supply device 100 in accordance with the present invention is different from the conventional switching power supply device 200 which is shown in FIG. 2 in terms that the switching power supply device 100 is provided with a diode D3 one end of which is connected to output end of the regulator 32, and another end of which is connected to between the voltage divider resistances R41, R42, and forward direction of the diode D3 being from the voltage divider resistances R41, R42 to the regulator 32.

In case where the voltage value of voltage VO3 which is in load side of the regulator 32, is a prescribed voltage threshold value (for example, 2 volt) set in advance or less, the diode D3 (corresponding to the feedback current decreasing portion) makes electric current value of the feedback current Ib that is detected by the constant voltage control portion 4 to be the electric current value of the feedback current Ib in case where the direct current voltage VO2 which is output from the high frequency rectifying portion 31, has a voltage value less than the first voltage value (5 volt in the present embodiment) (in the present embodiment, it makes the feedback current Ib to be "zero").

To be more concrete, the diode D3 makes the electric current value of feedback current Ib to be "zero" by making the feedback voltage (the reference voltage) Vref to be the breakdown voltage of the shunt regulator ZD4 (2.4 volt in the present embodiment) or less.

Because the voltage control operation of the switching power supply device 100 which is structured as above described, is quite the same as the voltage control operation of the conventional switching power supply device 200 that is explained with reference to FIG. 2, the explanation for it will be omitted. Hereinafter, explanation will be given about operation of the switching power supply device 100 in case where load of the regulator 32 is shunted in a state where the direct current voltage VO2 is 5 volt (the first voltage value) which is the setting voltage.

If the load of the regulator 32 is shunted, direct current voltage VO3 of the output side of the regulator 32 becomes "zero", and also the feedback voltage Vref becomes "zero" through the diode D3. As a result, the control portion 13 judges that the direct current voltage VO2 is smaller than 5 volt (the first voltage value) which is the setting voltage, and outputs a command signal to the switching portion 12 in order to make the oscillation cycle higher, then the direct current voltages VO1, VO2 are increased.

Therefore, the voltage value of the direct current voltages VO1, VO2 which are applied to the zener diodes ZD31, ZD32, exceed the zener voltages of the zener diodes ZD31, ZD32, then, the zener diodes ZD31, ZD32 break down, and large current flows in the secondary winding 23. As a result, the over current protection circuit 131 judges that the over current flows in the secondary winding 23 through the auxiliary winding 22, and output a command signal to the switching portion 12 in order to stop generating the direct current voltage (to stop switching operation), and the switching operation is stopped.

Then, in the switching power supply device 100, in case where the load of the regulator 32 is shunted, it becomes possible to prevent damage of the regulator 32 and at the same time to stop the switching operation.

As above described, a plurality of direct current voltages VO1, VO2 (2 in the present embodiment) having a plurality of voltage values are generated from power that is supplied from the commercial power source, the auxiliary winding 22 detects the voltage value of the control voltage Vc which is the voltage that is proportional to the voltage of the secondary side of the transformer 2, and the constant voltage control portion 4 detects the electric current value of the feedback current Ib which is electric current that is proportional to the direct current voltage VO2 which corresponds to the first voltage value (5 volt in the present embodiment) among the direct current voltages VO1, VO2 of the plurality of generated voltage values (two in the present embodiment). Further, the zener diodes ZD31, ZD32 become conduction state in case where the voltage values of the direct current voltages VO1, VO2 which respectively correspond to the plurality of (2 in the present embodiment) voltage values that are generated, are respectively the prescribed voltage threshold values (zener voltage in the present embodiment) set in advance or more, and makes the over current that is electric current of the current threshold value set in advance or more flow in the secondary side of the transformer 2. In addition, the control portion 13 controls the generated direct current voltages VO1, VO2 based on the voltage value of the control voltage Vc and electric current value of the feedback current Ib, and the over current protection circuit 131 stops generation of the direct current voltages VO1, VO2 in case where the over current which is current of the current threshold value set in advance or more flows in the secondary side of the transformer 2. Further, the direct current voltage VO2 which corresponds to the generated first voltage value (5 volt in the present embodiment) is input to the regulator 32, and the direct current voltage VO3 which has the second voltage value (3.3 volt in the present embodiment) that is different from the first voltage value (5 volt in the present embodiment) is output. When the voltage value of the load side of the regulator 32 is a prescribed voltage threshold value set in advance or less, the diode D3 makes the electric current value of the feedback current Ib to be the electric current value of the feedback current Ib ("zero" in the present embodiment) in case where voltage value of the generated direct current voltage VO2 is less than the first voltage value (5 volt in the present embodiment). As a result, the switching operation can be stopped with simple structure in case where the load that is connected to the regulated power supply circuit (the regulator 32 in the present embodiment) is shunted.

That is, in case where the load which is connected to the regulated power supply circuit (the regulator 32 in the present embodiment) is shunted, the direct current voltage VO1, VO2 which is generated is increased by the control portion 13, because the electric current value of the feedback current Ib is made the electric current value of the feedback current Ib ("zero" in the present embodiment) when the generated direct current voltage VO2 has a voltage value that is less than the first voltage value (5 volt in the present embodiment) by the diode D3. Then, any one of the zener diodes ZD31, ZD32 is made to be conduction state. As a result, the over current of an electric current threshold value set in advance or more, flows in the secondary winding 23 of the transformer 2, and generation of the direct current voltages VO1, VO2 is stopped by the over current protection circuit 131. As a result, the switching operation can be stopped by simple structure in case where the load that is connected to the regulated power supply circuit (the regulator 32 in the present embodiment) is shunted.

That is, because the diode D3 is disposed in the conventional switching power supply device 200, and the diode D3 makes the electric current value of the feedback current Ib to be the electric current value of the feedback current Ib ("zero" in the present embodiment) when the generated direct current voltage has a voltage value which is less than the first voltage value in case where the voltage value (direct current voltage VO3) in load side of the regulated power supply circuit (the regulator 32 in the present embodiment) is the prescribed voltage threshold value set in advance or less, the switching operation can be stopped with simple structure in case where the load that is connected to the regulated power supply circuit (the regulator 32 in the present embodiment) is shunted.

Further, because the constant voltage control portion 4 is provided with the photo coupler 41 and the feedback current Ib is fed back to the control portion 13 through the photo coupler 41, the feedback current Ib can be fed back to the control portion 13 in a state where the primary side and the secondary side are electrically insulated. As a result, the switching operation can be surely stopped in case where the load that is connected to the regulated power supply circuit (the regulator 32 in the present embodiment) is shunted.

Further, because the electric current value of the feedback current Ib is set "zero" by the diode D3 in case where the voltage value of the direct current voltage VO3 of the load side of the regulated power supply circuit (the regulator 32 in the present embodiment) is the second voltage threshold value set in advance or less ("zero" in the present embodiment), the generated direct current voltages VO1, VO2 are increased quickly by the control portion 13. As a result, the switching operation can be quickly stopped in case where the load that is connected to the regulated power supply circuit (the regulator 32 in the present embodiment) is shunted.

In addition, because the constant voltage control portion 4 is provided with the shunt regulator ZD4 one end of which is connected in series to the light emitting diode of the photo coupler 41 and another end of which is grounded, the feedback voltage that corresponds to the feedback current Ib is generated from the direct current voltage VO2 by the voltage divider resistances R41, R42 to apply as the reference voltage Vref to the shunt regulator ZD4, and the feedback voltage is made to be the breakdown voltage of the shunt regulator ZD4 (2.4 volt in the present embodiment) or less by the diode D3, the electric current value of the feedback current Ib is made to be "zero". As a result, the switching operation can be stopped with simpler structure in case where the load that is connected to the regulated power supply circuit (the regulator 32 in the present embodiment) is shunted.

That is, because the constant voltage control portion 4 is provided with the shunt regulator ZD4 one end of which is connected in series to the light emitting diode of the photo coupler 41 and another end of which is grounded, and the feedback voltage that corresponds to the feedback current Ib is generated from the direct current voltage VO2 by the voltage divider resistances R41, R42 to apply as the reference voltage Vref to the shunt regulator ZD4, the feedback current decreasing portion can be realized with simple structure in order to make the feedback voltage (the reference voltage Vref) to be the breakdown voltage of the shunt regulator ZD4 (2.4 volt in the present embodiment) or less. As a result, the switching operation can be stopped with simpler structure in case where the load that is connected to the regulated power supply circuit (the regulator 32 in the present embodiment) is shunted.

Further, because the feedback current decreasing portion is composed of the diode D3 one end of which is connected to output end of the regulator 32, another end of which is connected to between the voltage divider resistances R41, R42, and forward direction of the diode being from the voltage divider resistances R41, R42 to the regulator 32, the feedback current decreasing portion can be realized with simple structure. As a result, the switching operation can be stopped with simpler structure in case where the load that is connected to the regulated power supply circuit (the regulator 32 in the present embodiment) is shunted.

In addition, because the zener diode ZD31, ZD32 are made to be conduction state when voltage values of the direct current voltages VO1, VO2 are respectively the prescribed voltage threshold values (the zener voltage in the present embodiment) set in advance or more, the switching operation can be stopped more quickly in case where the load that is connected to the regulated power supply circuit (the regulator 32 in the present embodiment) is shunted.

That is, because the zener diode ZD31, ZD32 are made to be conduction state when voltage values of the direct current voltages VO1, VO2 are respectively the prescribed voltage threshold values (the zener voltage in the present embodiment) set in advance or more, and they are made to be the conduction state in order of voltage values of the plurality of direct current voltages VO1, VO2 exceeding the voltage threshold value (the zener voltage in the present embodiment) when the generated direct current voltage VO1, VO2 are increased by the control portion 13, the switching operation can be stopped more quickly in case where the load that is connected to the regulated power supply circuit (the regulator 32 in the present embodiment) is shunted.

Because the over current generating portion is provided with the zener diode one end of which is connected to the output terminal of the direct current voltage generating portion and another end of which is grounded, the over current generating portion can be realized with the simple structure. As a result, the switching operation can be stopped with simpler structure in case where the load that is connected to the regulated power supply circuit (the constant voltage output portion in the present embodiment) is shunted.

In addition, because the constant voltage output portion is composed of the three terminal regulator, the switching operation can be stopped with simple structure in case where the load that is connected to the three terminal regulator is shunted.

Further, because the voltage between both ends of the auxiliary winding 22 which is disposed in the primary side of the transformer 2 is detected as the control voltage Vc, the control voltage detecting portion can be realized with simple structure. As a result, the switching operation can be stopped with simpler structure in case where the load that is connected to the regulated power supply circuit (the regulator 32 in the present embodiment) is shunted.

In addition, because the over current protection circuit 131 judges that the over current flows or not based on the electric current value of electric current which flows in the auxiliary winding 22, it can be judged whether the over current flows or not with simple structure. As a result, the switching operation can be stopped with simpler structure in case where the load that is connected to the regulated power supply circuit (the regulator 32 in the present embodiment) is shunted.

It should be noted that the present invention can be applied in below described embodiments.

(A) Though in the above described embodiment the explanation was given about the case where the switching power supply device 100 is the RCC method switching power supply. However, it is no problem that the switching power supply device 100 is other method switching power supply (for example, PWM(Pulse Width Modulation) method or the like).

(B) Though in the above described embodiment the explanation was given about the case where the feedback current decreasing portion is composed of the diode D3. However, it is no problem that the feedback current decreasing portion is composed of other element (for example, transistor or the like).

(C) Though in the above described embodiment the explanation was given about the case where the constant voltage output portion is composed of the three terminal regulator 32 which is one kind of the series regulator. However, it is no problem that the constant voltage output portion is composed of a DC-DC converter or the series regulator.

(D) Though in the above described embodiment the explanation was given about the case where the over current generating portion is composed of the zener diode ZD31, ZD32. However, it is no problem that the over current generating portion is composed of the zener diode ZD31, ZD32 connected to other element (for example, a diode, a resistance, or the like) in series.

(E) Though in the above described embodiment the explanation was given about the case where the over current generating portion is disposed at the output terminals of the direct current voltages VO1, VO2, respectively. However, it is no problem that the over current generating portion is disposed at any one of the output terminal of the direct current voltages VO1, VO2.

What is claimed is:

1. A switching power supply device which is disposed in an electronic equipment and supplies a direct current voltage based on a first direct current voltage having a previously set first voltage value to a device that is disposed in the electronic equipment, the switching power supply device is characterized by comprising:

a direct current voltage generating portion which has a switching element and a transformer and generates a direct current voltage having at least one voltage value from power that is supplied from a power source through the switching element and the transformer;

a control voltage detecting portion which detects a control voltage which is proportional to voltage of a secondary side of the transformer;

a constant voltage output portion which receives the first direct current voltage and outputs a second direct current voltage having a second voltage value different from the first voltage value;

a feedback current detecting portion which detects a feedback current which is approximately proportional to the first voltage value of the first direct current voltage;

a feedback current decreasing portion which, when the second voltage value is equal to or less than a previously set first voltage threshold value, outputs part of a current output from the direct current voltage generating portion to the constant voltage output portion to the output side of the constant voltage output portion and thereby makes an electric current value of the feedback current less than an electric current value approximately proportional to the first voltage value of the first direct current voltage;

a control portion which controls the direct current voltage which is generated by the direct current voltage generating portion based on the voltage value of the control voltage and the electric current value of the feedback current input from the feedback current detecting portion;

an over current generating portion which, when the first voltage value is equal to or more than a previously set second voltage threshold value, makes an over current having an electric current value equal to or more than a previously set current threshold value flow through the secondary side of the transformer; and an over current protection circuit which, when the over current flows through the secondary side of the transformer, makes the direct current voltage generating portion stop generating the direct current voltage.

2. The switching power supply device according to claim 1, wherein the feedback current detecting portion is provided with a photo coupler and feeds back the feedback current to the control portion through the photo coupler.

3. The switching power supply device according to claim 2, characterized in that the electric current value of the feedback current is approximately zero when the second voltage value of the output side of the constant voltage output portion is equal to or less than the first voltage threshold value.

4. The switching power supply device according to claim 3, characterized in that the feedback current detecting portion is provided with
a shunt regulator one end of which is connected to a light emitting element of the photo coupler in series and another end of which is grounded, and voltage divider resistances which generate a feedback voltage that corresponds to the feedback current from the first direct current voltage generated by the direct current voltage generating portion and apply it as a reference voltage to the shunt regulator, and the electric current value of the feedback current is approximately zero when the feedback voltage is equal to or less than a breakdown voltage of the shunt regulator.

5. The switching power supply device according to claim 4, wherein the feedback current decreasing portion is composed of a diode one end of which is connected to an output end of the constant voltage output portion and another end of which is connected to between the voltage divider resistances, and forward direction of the diode being from the voltage divider resistances to the constant voltage output portion.

6. The switching power supply device according to claim 1, wherein the direct current voltage generating portion generates direct current voltages which have a plurality of voltage values, and the over current generating portions are disposed for respective direct current voltages that correspond to the plurality of voltage values.

7. The switching power supply device according to claim 1, wherein the over current generating portion is composed a zener diode one end of which is connected to an output terminal of the direct current voltage generating portion and another end of which is grounded.

8. The switching power supply device according to claim 1, wherein the constant voltage output portion is composed of a DC-DC converter or a series regulator.

9. The switching power supply device according to claim 1, wherein the control voltage detecting portion is provided with an auxiliary winding which is disposed in a primary side of the transformer and detects voltage between both ends of the auxiliary winding as the control voltage.

10. The switching power supply device according to claim 9, wherein the over current protection circuit judges whether the over current flows or not based on the electric current value of current which flows in the auxiliary winding of the control voltage detecting portion.

* * * * *